(12) United States Patent
Singh et al.

(10) Patent No.: US 12,137,049 B1
(45) Date of Patent: Nov. 5, 2024

(54) EXTENDING VIRTUAL ROUTING AND FORWARDING

(71) Applicant: Amazon Technologies, Inc., Seattle, WA (US)

(72) Inventors: Bijendra Singh, Cedar Park, TX (US); Thomas A. Volpe, Austin, TX (US); Kari Ann OBrien, Austin, TX (US); Kiran Kalkunte Seshadri, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 16/841,368

(22) Filed: Apr. 6, 2020

Related U.S. Application Data

(62) Division of application No. 15/077,694, filed on Mar. 22, 2016, now Pat. No. 10,623,315.

(51) Int. Cl.
| | |
|---|---|
| *H04L 45/741* | (2022.01) |
| *H04L 12/46* | (2006.01) |
| *H04L 45/586* | (2022.01) |
| *H04L 69/22* | (2022.01) |

(52) U.S. Cl.
CPC ........ *H04L 45/741* (2013.01); *H04L 12/4633* (2013.01); *H04L 45/586* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 7,283,563 B1* | 10/2007 | Allan | ..................... | H04L 45/502 709/228 |
| 7,742,406 B1* | 6/2010 | Muppala | ................. | H04L 47/10 370/392 |
| 8,094,659 B1* | 1/2012 | Arad | ....................... | H04L 49/70 370/392 |
| 9,019,962 B1* | 4/2015 | Ghosh | ................... | H04L 45/586 370/392 |
| 2001/0005381 A1* | 6/2001 | Sugiyama | .......... | H04Q 11/0478 370/395.2 |
| 2001/0016914 A1* | 8/2001 | Tabata | ................ | H04L 63/0272 726/15 |
| 2006/0013209 A1* | 1/2006 | Somasundaram | ...... | H04L 45/54 370/389 |
| 2006/0294211 A1* | 12/2006 | Amato | .................... | H04L 45/28 709/220 |
| 2009/0116483 A1 | 5/2009 | Anumala et al. | | |

(Continued)

OTHER PUBLICATIONS

U.S. Appl. No. 15/077,694, "Final Office Action", Jan. 2, 2019, 40 pages.

(Continued)

*Primary Examiner* — Adnan Baig
(74) *Attorney, Agent, or Firm* — Kilpatrick Townsend & Stockton LLP

(57) ABSTRACT

In one embodiment of the disclosure, packets are routed according to a VRF (Virtual Routing and Forwarding) domain that is represented by a VRF identifier in a VRF-identifier (ID) field of packet headers. In one embodiment of the disclosure, a VRF identifier may be added to a VRF-ID field of a packet header so that the packet is routed according to a VRF domain that the packet belongs to.

15 Claims, 9 Drawing Sheets

(56) References Cited

U.S. PATENT DOCUMENTS

| | | | |
|---|---|---|---|
| 2010/0158010 A1 | 6/2010 | Kang et al. | |
| 2011/0032843 A1* | 2/2011 | Papp | H04L 12/4666 |
| | | | 370/254 |
| 2011/0199891 A1* | 8/2011 | Chen | H04L 45/50 |
| | | | 370/255 |
| 2013/0163594 A1 | 6/2013 | Sharma et al. | |
| 2014/0328343 A1 | 11/2014 | Kapadia et al. | |
| 2015/0078378 A1* | 3/2015 | Wijnands | H04L 45/74 |
| | | | 370/390 |
| 2016/0366051 A1* | 12/2016 | Chen | H04L 45/02 |
| 2017/0230467 A1* | 8/2017 | Salgueiro | H04L 41/0893 |

OTHER PUBLICATIONS

U.S. Appl. No. 15/077,694, "Non Final Office Action", May 17, 2018, 32 pages.

U.S. Appl. No. 15/077,694, "Non-Final Office Action", May 30, 2019, 42 pages.

U.S. Appl. No. 15/077,694, "Notice of Allowance", Dec. 11, 2019, 10 pages.

* cited by examiner

EXTENDING VIRTUAL ROUTING AND FORWARDING

CROSS REFERENCE TO RELATED APPLICATIONS

This application claims priority to and is a divisional of U.S. application Ser. No. 15/077,694, filed Mar. 22, 2016, issued as U.S. Pat. No. 10,623,315 on Apr. 14, 2020, and titled "EXTENDING VIRTUAL ROUTING AND FORWARDING", the contents of which are herein incorporate in its entirety.

BACKGROUND

Consumers and businesses depend on networks for communication, data storage, and information gathering, for example. Internet Protocol (IP) is a communication protocol that is generally used to route packets from a source through different networks to the intended destination. An IP packet typically includes a packet header and a payload. The payload includes the information to be sent from the source to the destination and the packet header typically includes metadata required to route the packet. A source IP address and a destination IP address are examples of metadata that may be included in the packet header. Routers forward and route the IP packets to transport the IP packets from their source to their destination.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure includes devices, systems, and methods of extending Virtual Routing and Forwarding (VRF) in a variety of networking contexts. In embodiments of the disclosure, packets can be routed according to VRF identifiers that are included in the packet header of an IP (Internet Protocol) packet. The VRF identifiers included in the packets may be part of a VRF Extension Option of the packets. Additionally, the VRF identifier can be added to the existing packet header format used in Internet Protocol version four (IPv4) or Internet Protocol version six (IPv6) to facilitate end-to-end VRF across different networks.

In one embodiment of the disclosure, a network element (e.g. a router) includes a plurality of ports to send and receive network traffic. The ports may be ethernet ports and the network traffic may be packets adhering to Internet Protocol (IP) such IPv4 or IPv6. The router may also include processing logic (e.g., integrated circuits, processors, systems-on-chip (SoCs), application-specific integrated circuits (ASICs), or field-programmable gate arrays (FPGAs)) and memory for storing routing tables corresponding to respective VRF domains. The processing logic can be configured to operate according to firmware and/or software instructions. The processing logic may inspect a VRF-ID field of ingress packet headers for a VRF identifier representative of a VRF domain that the ingress packet headers and associated packet payloads belong to. The VRF identifiers included in the packets may populate a VRF Extension Option of the packets. The router may then route the ingress packet headers and the associated packet payloads according to the routing table that corresponds with the VRF domain that is represented by the VRF identifier of the IP packet.

The disclosure also includes a method of virtualizing a network. The method may be performed by a network element such as a router. A VRF identifier may be added to a packet header of an ingress IP packet. The VRF identifier added to the packet header may populate a VRF Extension Option of the packets. The packet header may be received at a port of the network element and not have a VRF identifier. After the VRF identifier is added to the packet header, the ingress IP packet may be routed according to a routing table of the VRF domain represented by the VRF identifier.

Figure 1:
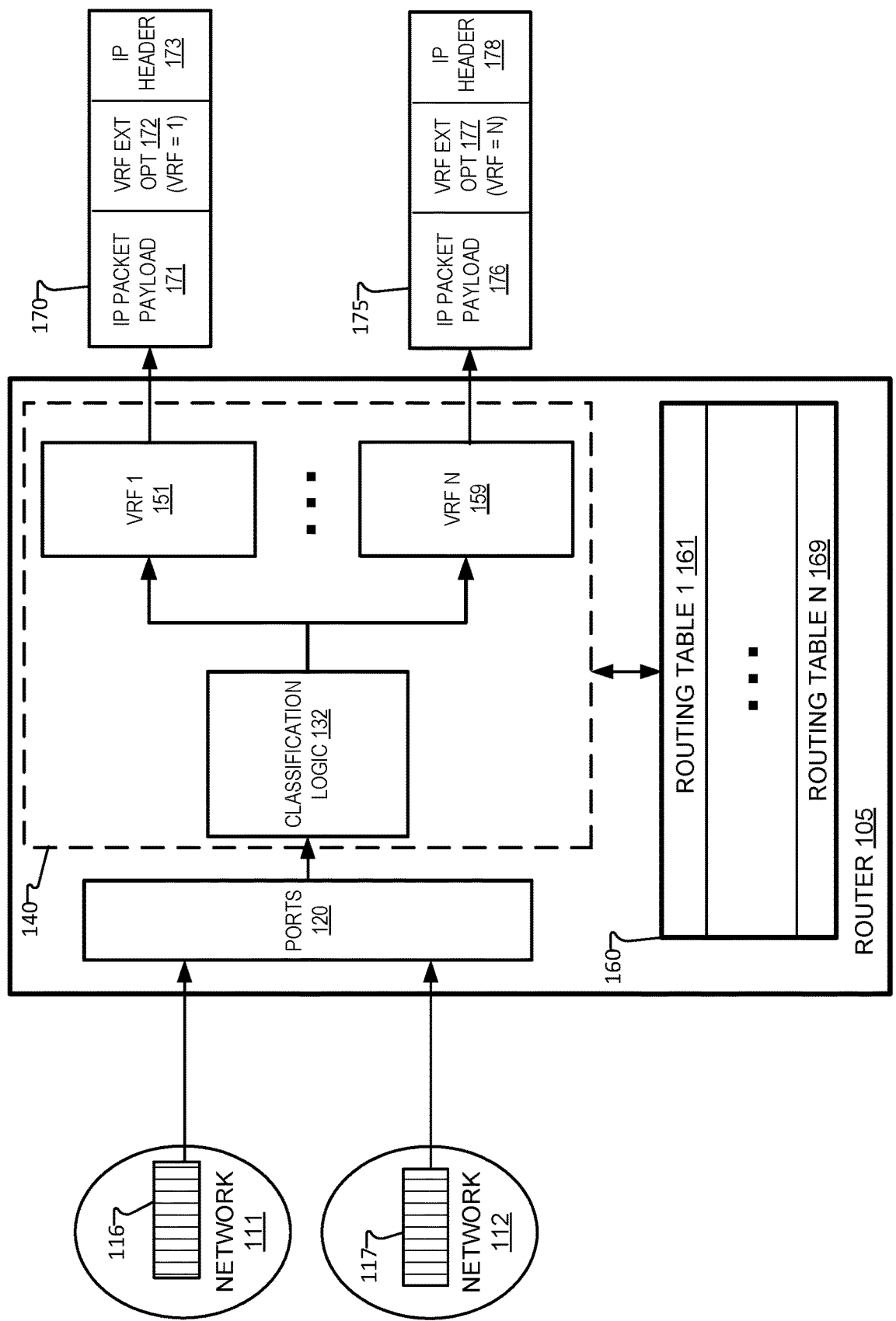
FIG. 1 includes an example router for implementing a Virtual Routing and Forwarding (VRF) Extension Internet Protocol (IP) Option.

FIG. 1 includes an example router 105 for implementing a Virtual Routing and Forwarding (VRF) Extension IP Option. In FIG. 1, router 105 includes ports 120, a memory 160, and processing logic 140. The ports are configured to send and receive network traffic. The ports may be ethernet ports, for example. In the illustrated embodiment, network 111 is configured to send ingress packets 116 to router 105 via ports 120. Network 112 is configured to send ingress packets 117 to router 105 via ports 120. Packets 116 and 117 may be transmitted in an IP (Internet Protocol) format such as IPv4 (Internet Protocol version four) or IPv6 (Internet Protocol version six). Processing logic 140 is coupled to receive IP network traffic from the plurality of ports.

Router 105 is a VRF router for routing packets according to routing tables identified by a VRF identifier of a VRF Extension Option described in this disclosure. VRF is a technology that allows one physical router to route packets according to different routing tables. The different routing tables can be stored independently by one or more memories of the same physical router. The memory may be partitioned to separate the independent routing tables stored in the memory. Each routing table corresponds to a respective VRF domain.

Traditionally, VRFs are identified by ranges in IP addresses. However, determining VRFs by IP addresses is inherently limiting as it requires that the IP addresses not overlap. In embodiments of the disclosure, VRFs are determined by VRF identifiers of a VRF Extension Option rather than by IP addresses or other traditional methods. With the VRF identifier added to packets, each network element (e.g. router) can route the packets according to the VRF domain associated with the VRF identification number. This allows for the same or overlapping IP addresses being utilized by different VRFs without dedicating separate physical resources to each VRF to avoid IP address conflicts. Since each VRF can truly be implemented as a virtual slice of the physical resources of each network element, the network elements can scale dynamically rather than dedicating physical network resources to route each VRF or customer utilizing a network. The routing tables for different VRFs may change (grow or shrink) dynamically as more or less routes are added or subtracted to a network. By using shared physical resources of the same router (e.g. processing resources and memory resources) yet separating the routing table, routing of packets is virtualized into different VRFs. In this way, a VRF-aware network can be treated as one large "pool" network capacity which is not statically assigned to one specific VRF or one specific customer/entity. Therefore, the routers and ports included in a VRF-aware network can be dynamically allocated/deallocated on a per-VRF to accommodate the network demands for the different VRFs.

Referring to FIG. 1, processing logic 140 receives packets from port(s) 120. Processing logic 140 may determine whether the packets include a VRF Extension Option. If the packet includes the VRF Extension Option, the packet is routed according to a VRF domain represented by a VRF identification number within the VRF Extension Option. If the packet does not include the VRF Extension Option, processing logic 140 may add the VRF Extension Option to a header of the packet. If router 105 is at the "edge" of a VRF-aware network, packets 116 and 117 may be known to not have a VRF Extension Option because they are being received from networks 111 and 112 and router 105 is at the edge of a VRF-aware network. In this case, processing logic 140 may not perform operations to determine whether or not the packets have a VRF Extension Option on the assumption that the packets do not include a VRF Extension Option. Instead, processing logic 140 may simply add the VRF Extension Option to the packets according to the port the packet was received on, a VLAN identifier in the packet header, a source IP of the packet, a destination IP of the packet, an IP protocol, or otherwise.

In IPV4, the header format includes a header checksum field, a source IP address field, a destination IP address, among other fields, as is known in the art. IPv4 format also includes an Options field. Processing logic 140 adds data to the Options field of the IPV4 header to implement the VRF Extension Option, in one example implementation.

Figure 2:
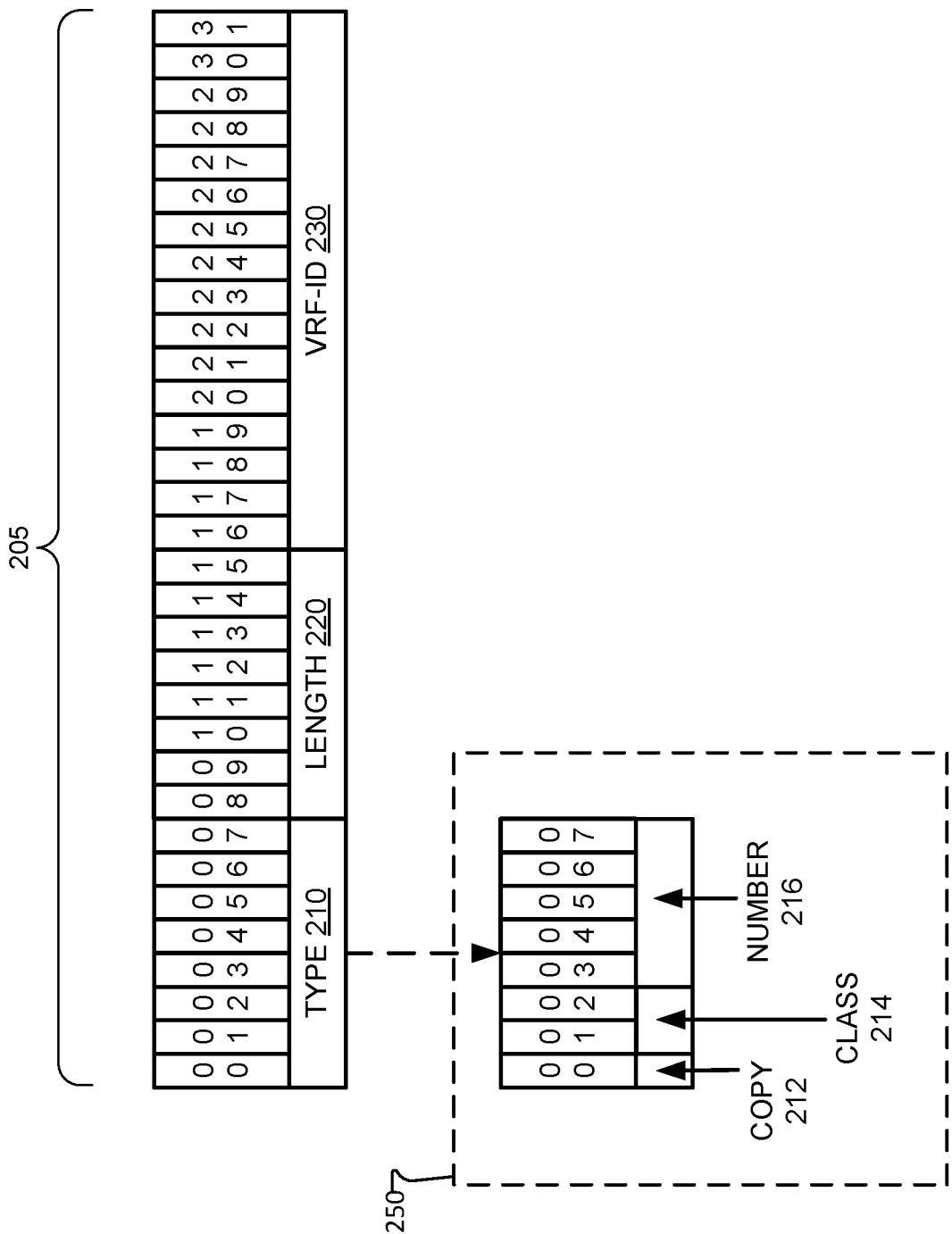
FIG. 2 illustrates an Options field of an IPV4 (Internet Protocol version four) header for implementing a VRF Extension Option.

FIG. 2 illustrates a four-byte Options field 205 of an IPV4 header. The Options field 205 of an IPV4 header is one way to include the VRF Extension Option in packets. Options field 205 includes a 1-byte Type field 210, a 1-byte Length field 220, and a 2-byte VRF-ID field 230, in the illustrated embodiment. Example Type byte 250 illustrates one example implementation of populating Type field 210 according to embodiments of the disclosure. In the illustrated embodiment, copy bit 212 is set to one to imply the Option needs to be copied in all segments. Also in the illustrated embodiment, the two bits in class field 214 are set to two (10) to imply the Option is for debugging and measurement. The five bits of Number field 216 may be set to digital 26 (11010) in one example implementation. Length field 220 is populated with the number of bytes of Option field 205, which is four bytes in the illustrated embodiment. VRF-ID field 230 is populated with a VRF identifier that is representative of the VRF domain the packet belongs to. Having two bytes for the VRF-ID field 230 allows for 65536 (216) VRFs to be defined by the VRF-ID field 230. Although not a requirement, in one implementation, a VRF identifier of zero is written to VRF-ID field 230 to indicate a Global VRF.

Figure 3:
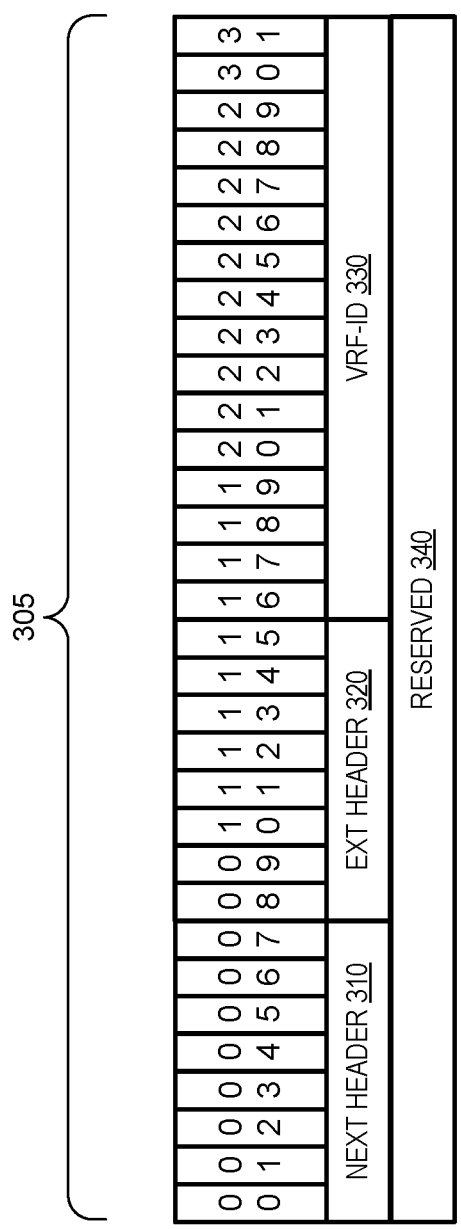
FIG. 3 illustrates an example Extension Header for an IPV6 (Internet Protocol version six) header for implementing a VRF Extension Option.

As an alternative to using IPv4 to indicate a VRF Extension Option, FIG. 3 illustrates an example Extension Header 305 for IP version six (IPv6) that may be utilized to indicate the VRF Extension Option. FIG. 3 includes an IPV6 Extension Header 305. IPv6 Extension Header 305 includes a Next Header field 310, and Extension Header field 320, a VRF-ID field 330, and a Reserved field 340. The fields are, respectively, 1-byte, 1-byte, 2-byte, and 4-byte, as illustrated. IPv6 Header types are indicated by the Next Header field 310, as detailed by the Internet Assigned Numbers Authority (IANA). For example, populating Next Header field 310 with zero indicates an IPV6 Hop-by-Hop Option and populating Next Header field 310 with digital 43 indicates a Routing Header for IPV6. Not all Extension Header types have been assigned. In one implementation of this disclosure, a VRF Extension Option is indicated by populating Next Header field 310 with digital 141. Other unassigned Extension Header numbers for Next Header field 310 may also be used to indicate a VRF Extension Option. In one implementation, Extension Header field 320 is populated with zero to indicate that the Extension Header length is zero (which means that the length is 8 bytes). VRF-ID field 330 can be populated with the VRF identifier, similarly to VRF-ID field 230 in that VRF-ID field 330 is populated with a VRF identifier that is representative of the VRF domain the packet belongs to. Having two bytes for the VRF-ID field 330 allows for 65536 ($2^{16}$) VRFs to be defined by the VRF-ID field 330. In one implementation, a VRF identifier of zero is written to VRF-ID field 330 to indicate a Global VRF. Reserved field 340 is reserved and can be populated with zeros.

Referring back to FIG. 1, processing logic 140 can be configured to route ingress IP packets according to routing tables that are identified by a VRF identifier in a VRF-ID field illustrated in FIG. 2 or FIG. 3. To route IP packets consistent with IPv4, processing logic 140 may inspect the Copy field 212, Class field 214, and Number field 216 of the Type field 210. As stated above, the VRF Extension Option may be indicated when the Copy field 212 is set to one, the Class field 214 is set to two, and the Number field 216 is set to digital 26. Alternatively, type field 210 may be set to different values to indicate the VRF Extension Option is present in a given ingress packet. In addition to confirming that the VRF Extension Option is indicated by Type field 210, processing logic 140 inspects VRF-ID field 230 to determine a VRF identifier in the VRF-ID field 230.

To route IP packets consistent with IPV6, processing logic 140 may inspect the Next Header field 310 to see if it is set to indicate the VRF Extension Option. As stated above, Next Header field 310 may be set to digital 141 to indicate the VRF Extension Option. In addition to confirming that the VRF Extension Option is indicated by Next Header field 310, processing logic 140 inspects VRF-ID field 330 to determine a VRF identifier in the VRF-ID field 330.

The VRF identifier in fields 230 or 330 is representative of the VRF domain that the ingress packet belongs to.

Processing logic 140 then routes the ingress packet according to a routing table that corresponds to the VRF domain that is represented by the VRF identifier.

In the illustrated embodiment, a packet that includes a VRF identifier of 1 is routed according to VRF 1 151. Routing the packet according to VRF 1 151 includes routing the packet with routing table 161, which is stored in memory 160, in the illustrated embodiment. Processing logic 140 is configured to read and write to memory 160. In the illustrated embodiment, memory 160 includes routing tables corresponding to respective VRF domains. Memory 160 is partitioned to store each routing table independently, in one embodiment. Memory 160 includes routing tables 161 to 169, in the illustrated embodiment. Routing table 1 161 corresponds to VRF domain 1, while routing table N 169 corresponds to VRF N where N is an integer number. In an embodiment consistent with FIG. 2 or FIG. 3 where egress packet 170 include a VRF identifier of one, N can be an integer number between two and 65535, for example.

Router 105 transmits egress packet 170, which has been routed according to VRF 1. Packet 170 includes an IP Header 173 and VRF Extension Option 172. The VRF Extension Option 172 refers to the fields 205 or 305 being populated to indicate a VRF Extension Option. The VRF identifier in the VRF-ID field 230 or 330 of Extension Option 172 is a one, as packet 170 belongs to VRF 1 and was accordingly processed by VRF 1.

Router 105 also transmits egress packet 175, which has been routed according to VRF N. Packet 175 includes an IP Header 178 and VRF Extension Option 177. The VRF Extension Option 177 refers to the fields 205 or 305 being populated to indicate a VRF Extension Option. The VRF identifier in the VRF-ID field 230 or 330 of Extension Option 177 is an integer number N, as packet 175 belongs to VRF N and was accordingly processed by VRF N. In an embodiment where a VRF identifier of zero indicates a Global VRF and egress packet 170 include a VRF identifier of one, N is an integer number between two and 65535, for example.

In addition to routing ingress packets that already include the VRF Extension Option, router 105 may also be configured to add a VRF Extension Option to ingress packets that do not indicate a VRF Extension Option and have no VRF identifier. For example, when router 105 receives ingress packets at port(s) 120, router 105 may add a VRF identifier to the received ingress packets.

Router 105 may use classification logic 132 to determine what VRF domain that the ingress packets belong to. In one embodiment, classification logic 132 may assign a VRF identifier (that is representative of the VRF domain the packets belong to) based on a port that the ingress packet is received by. In FIG. 1, for example, network 111 may send packet 116 to port 120 as an ingress IP packet. Packet 116 may not have a VRF identifier. However, classification logic 132 may assign packet 116 a VRF identifier (e.g. VRF 1) based on being received by a port 120 that only receives packets from network 111. Similarly, a different VRF identifier (e.g. VRF N) may be assigned to packet 117 from network 112 that is received at a different port 120.

In one embodiment, classification logic 132 may assign a VRF identifier based on header data in the header of the ingress packet. For example, the classification logic 132 may assign the VRF identifier based on a source IP address of the ingress packet. The source IP address may correspond with a particular VRF domain. For example, packet 116 may have a source IP address corresponding to network 111 and thus be given a first VRF identifier (e.g. VRF 1) while packet 117 may have a source IP address corresponding with network 112 and thus be given a second VRF identifier (e.g. VRF 2).

After the VRF identifier is written to the VRF-ID field 230/330, the packet may be routed as an egress packet according to the routing table of the VRF domain represented by the packet's VRF identifier.

Figure 4:
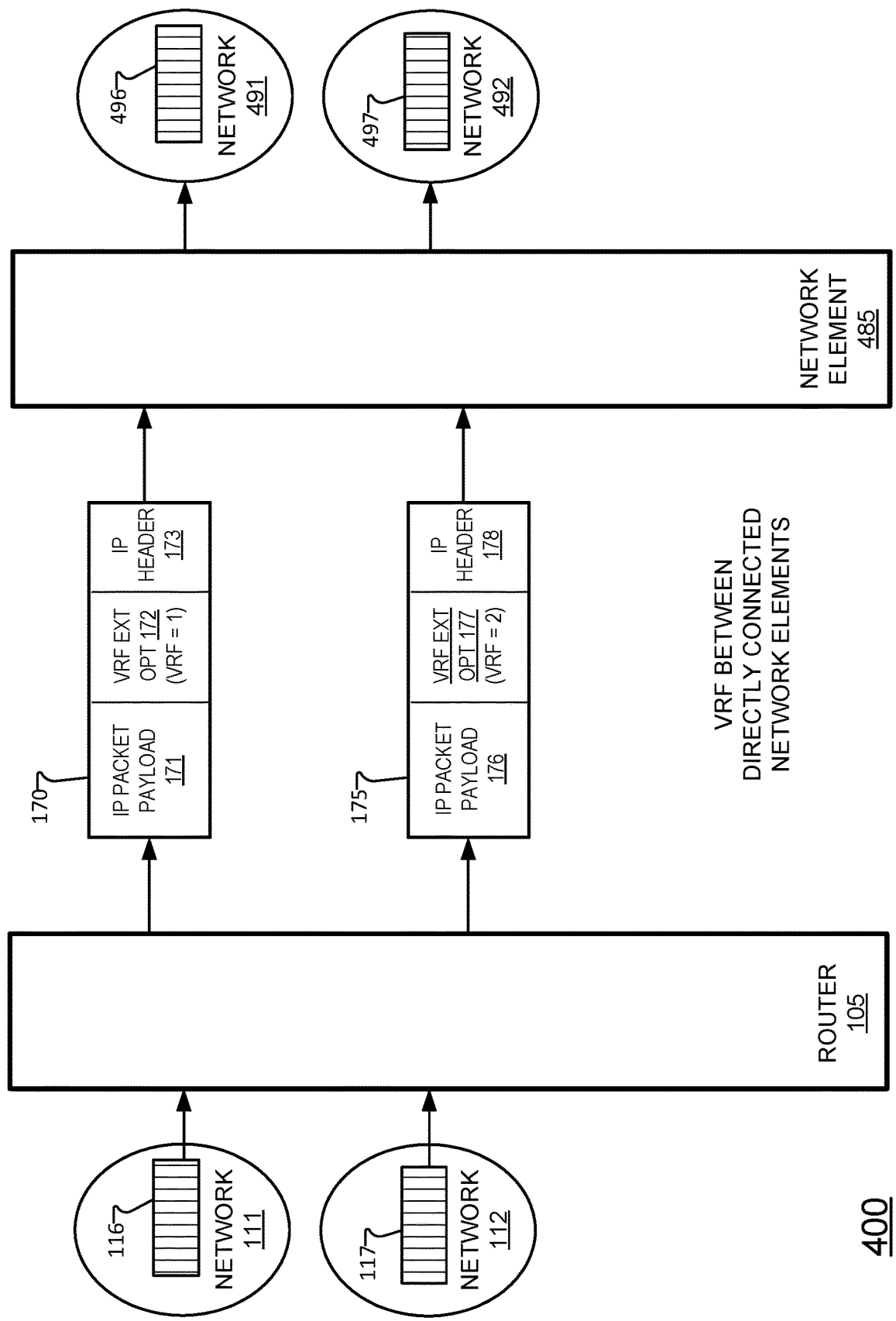
FIG. 4 illustrates a network system that extends a VRF between directly connected network elements.

FIG. 4 illustrates a network system 400 that extends a VRF between directly connected network elements. In FIG. 4, router 105 is included as an example network element. Network element 485 may be a router similar to router 105, in some embodiments. In FIG. 4, router 105 and network element 485 are both "VRF aware" elements in that they are configured to route packets that include the disclosed VRF Extension Option according to the VRF domain represented by the VRF identifier. Each network element may include a memory that stores the routing tables that correspond to each of the different VRFs. Router 105 and network element 485 may also be configured to add the VRF Extension Option to packets that are not populated with the VRF Extension Option, as described in the description of FIG. 1.

In FIG. 4, router 105 may route packet 116 coming from network 111 as packet 170. Packet 116 is routed by router 105 according to VRF 1 based on the VRF identifier being one. Network element 485 routes packet 170, which then egresses as packet 496 to network 491. Packet 170 is routed by network element 485 according to VRF 1 based on the VRF identifier being one. Thus, packet 116 is routed to network 491 entirely by routing tables corresponding to VRF 1. Also in FIG. 4, router 105 may route packet 117 coming from network 112, as packet 175. Packet 175 is routed by network element 485 as packet 497 to network 492. Packet 117 is routed by router 105 according to VRF 2 based on the VRF identifier being two. Packet 175 is routed by network element 485 according to VRF 2 based on the VRF identifier being two, in the illustrated example. Thus, packet 117 is routed to network 492 entirely by routing tables corresponding to VRF 2.

Network system 400 is potentially advantageous in that packets 116 and 117 can be routed to networks 491 and 492, respectively, even though they are routed by shared physical resources of router 105 and network element 485. When the routing tables for VRF 1 grow because more routes are added in the network system 400, router 105 and network element 485 are able to allocate processing and memory resources to route IP packets having the VRF identifier of one. Similarly, when the routing table for VRF 2 grows because more routes are added in the network system 400, router 105 and network element 485 are able to allocate processing and memory resources to route IP packets having the VRF identifier of two. Hence, instead of dedicating separate network elements to route different VRFs, resources (e.g. ports and routers) from shared network elements can be allocated dynamically to meet the network demand associated with different VRFs (VRF 1 through VRF N). Of course, although only two VRFs are described in FIG. 4, there may be thousands of VRFs and associated networks coupled to router 105 and network elements 485.

Figure 5:
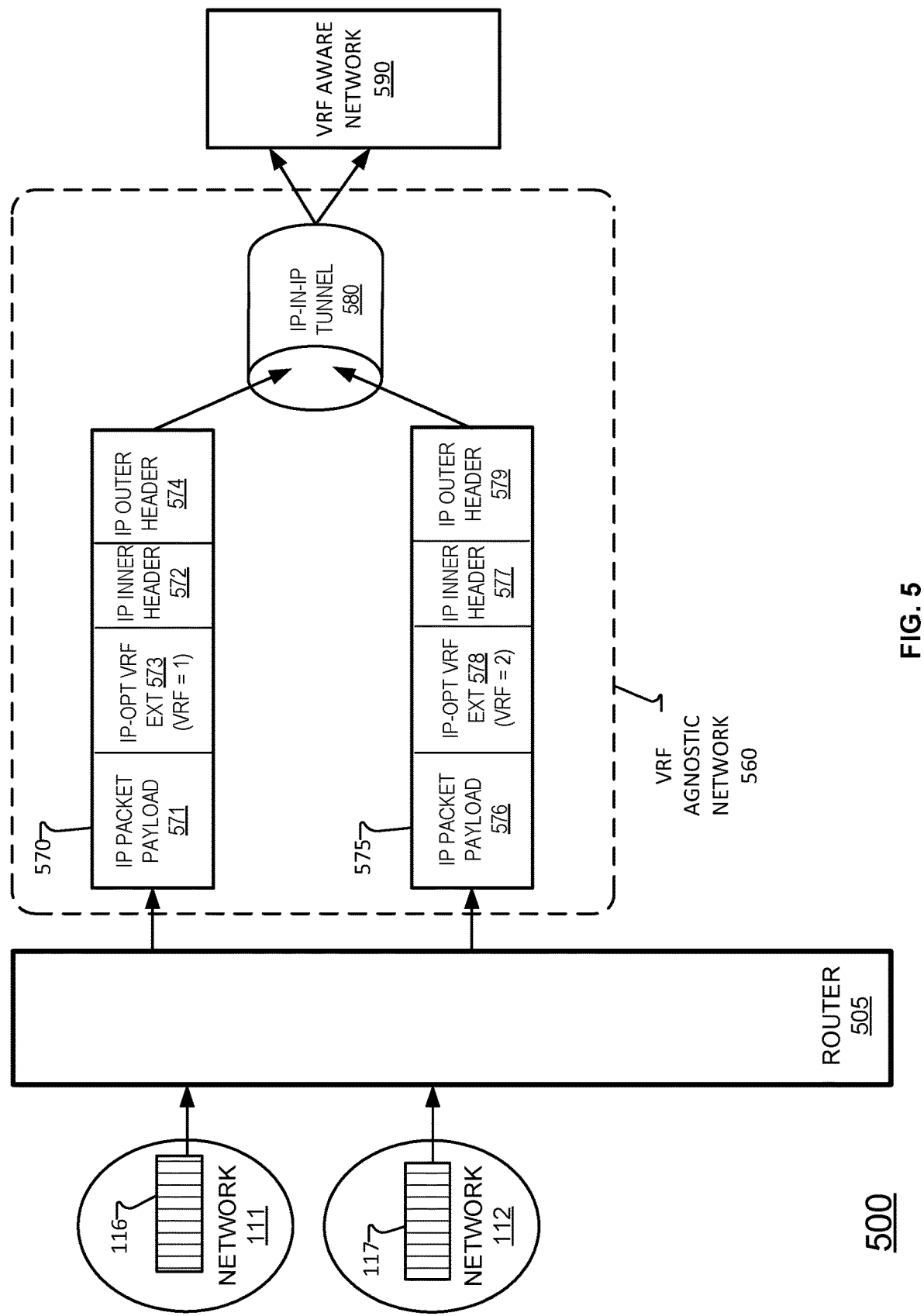
FIG. 5 illustrates an example network system that extends a VRF across geographically separated networks.

FIG. 5 illustrates an example network system 500 that extends a VRF across geographically separated networks. In FIG. 5, router 505 and network 590 are VRF aware networks in that they are configured to route IP packets according to routing tables indicated by a VRF identifier. In contrast, network 560 is a VRF agnostic network in that it is not configured to route IP packets according to the disclosed VRF identifiers. Network 560 may be a conventional network or a legacy network. Since network 560 is VRF agnostic, IP packets that include the VRF Extension Option are sent from VRF aware router 105 to VRF aware network 590 through VRF agnostic network 560 by way of an IP-in-IP tunnel 580. Router 505 and network 590 may be owned by a same entity while network 560 may be owned by a service provider or telecommunication utility.

Router 505 may be configured similarly to router 105. Router 505 may also be configured to encapsulate IP packets that include the VRF Extension Option within an IP tunneling packet format to send packets from networks 111 and 112 to network 590. To illustrate, in packet 570, VRF Option Extension 573 has been added to packet 116, which is encapsulated in IP Outer Header 574. IP Inner Header 572 may include the original IP packet header of packet 116. Packet 570 also includes IP packet payload 571, which was included in packet 116. IP Outer header 574 is formatted to transmit packet 570 through IP-in-IP tunnel 580 to network 590. In packet 575, VRF Option Extension 578 has been added to packet 117, which is encapsulated in IP Outer header 579. IP Inner Header 577 may include the original IP packet header of packet 117. Packet 575 also includes IP packet payload 576, which was included in packet 117. IP Outer Header 579 is formatted to transmit packet 575 through IP-in-IP tunnel 580 to network 590.

VRF aware network 590 may include a network element (e.g. a router) that receives packets 570 and 575. A network element of network 590 may strip the IP tunneling packet format from packet 570 so that VRF Extension Option 573 and IP packet payload 571 remain. IP packet payload 571 may then be forwarded by a network element of network 590 according to a routing table corresponding to a VRF domain represented by the VRF identifier (e.g. one) in VRF Extension Option 573. Similarly, a network element of network 590 may strip the IP tunneling packet format from packet 575 so that VRF Extension Option 578 and IP packet payload 576 remain. IP packet payload 576 may then be forwarded by a network element of network 590 according to a routing table corresponding to a VRF domain represented by the VRF identifier (e.g. two) in VRF Extension Option 578. Therefore, even when two VRF aware network elements are geographically separated by an intervening VRF agnostic network 560, the disclosed VRF Extension Option can still be utilized when an IP tunnel is utilized to send the packets that include the VRF Extension Option through the VRF agnostic network 560.

Figure 6:
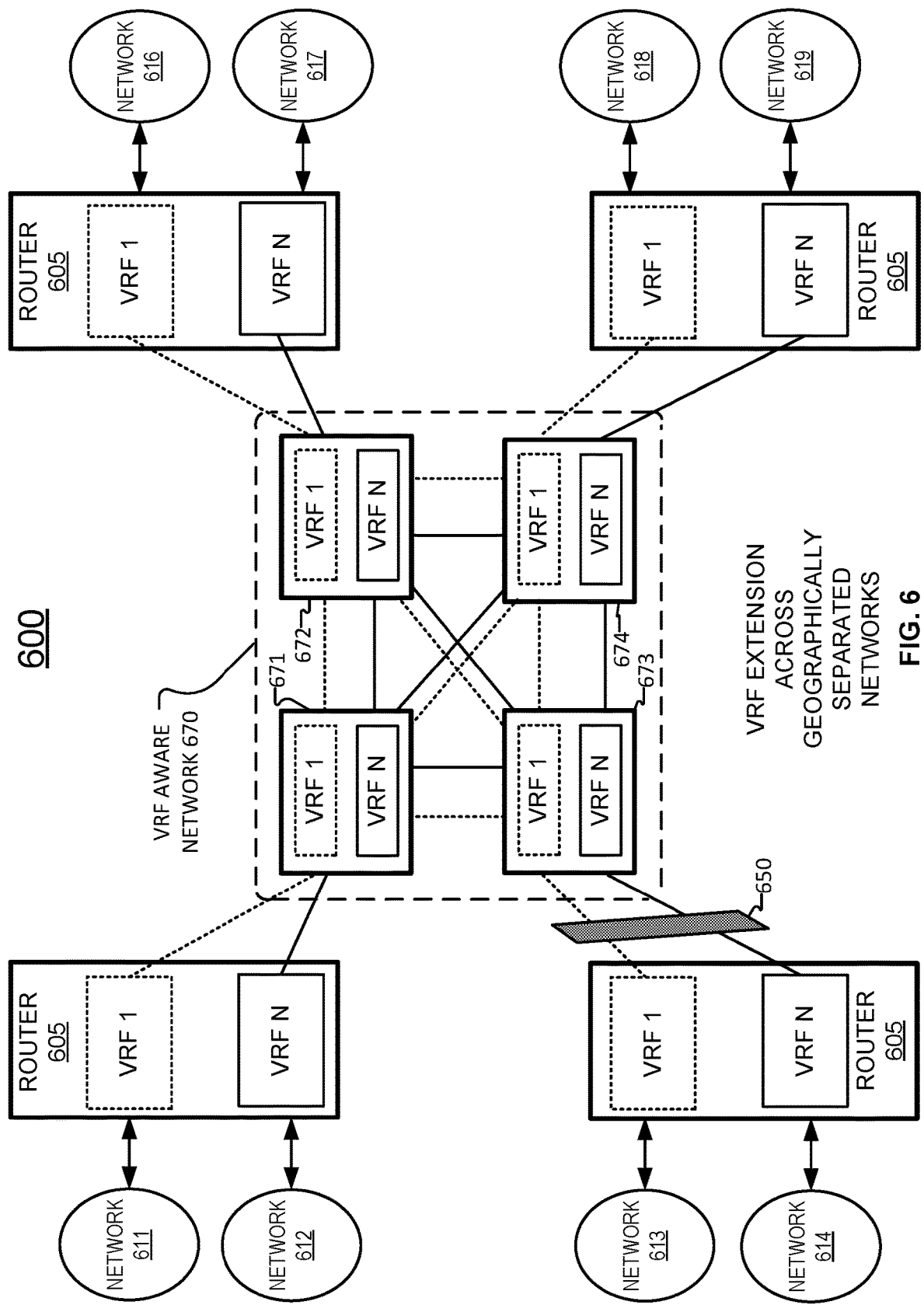
FIG. 6 also illustrates a network system for extending VRFs across geographically separated networks.

FIG. 6 illustrates a network system 600 for extending VRFs across geographically separated networks. In FIG. 6, networks 611, 613, 616, and 618 may be located in different cities. Networks 611, 613, 616, and 618 may be owned by a single entity (e.g. corporation or organization). Networks 612, 614, 617, and 619 may also be located in different cities. Networks 612, 614, 617, and 619 may be owned by a different entity than 611, 613, 616, and 618. In the illustrated embodiment, packets from networks 611, 613, 616, and 618 may be routed according to VRF 1 while packets from Networks 612, 614, 617, and 619 may be routed according to VRF N. Packets received from networks 611, 613, 616, and 618 may be assigned a VRF identifier of 1 by routers 605. Packets received from networks 612, 614, 617, and 619 may be assigned a VRF identifier of integer N by routers 605.

VRF aware network 670 may be located in a location that is remote from the different cities. VRF aware network 670 may represent a data-center network or a service-provider network or a metro-Ethernet network, for example. VRF aware network 670 includes network elements 671, 672, 673, and 674 that are configured to route IP packets that include the disclosed VRF Option Extension. As packets are transmitted between networks 611, 613, 616, and 618 via network system 600, they are routed according to VRF 1 as packets from networks 611, 613, 616, and 618 include the VRF identifier of one in the packet's VRF Extension Option. As packets are transmitted between networks 612, 614, 617, and 619 via network system 600, they are routed according to VRF N as packets from networks 612, 614, 617, and 619 include the VRF identifier of N in the packet's VRF Extension Option. Routers 605 may be placed on the "edge" of a VRF-aware network that includes VRF aware network 670 and routers 605. As described in FIG. 1, routers 605 may receive packets from networks 611-619 that do not have the VRF Extension Option and routers 605 may add the VRF Extension Option to received packets. Routers 605 may also strip away the VRF Extension Option to egress packets that are transmitted to networks 611-619 if networks 611-619 are not VRF-aware networks because the VRF Extension Option would be of little use to VRF agnostic networks.

Routers 605 may include the features of routers 105 and 505. FIG. 6 includes IP-in-IP tunnel 650. Routers 605 may encapsulate IP packets similarly to router 505 to tunnel the packets to network 670 via IP-in-IP tunnel 650.

Figure 7:
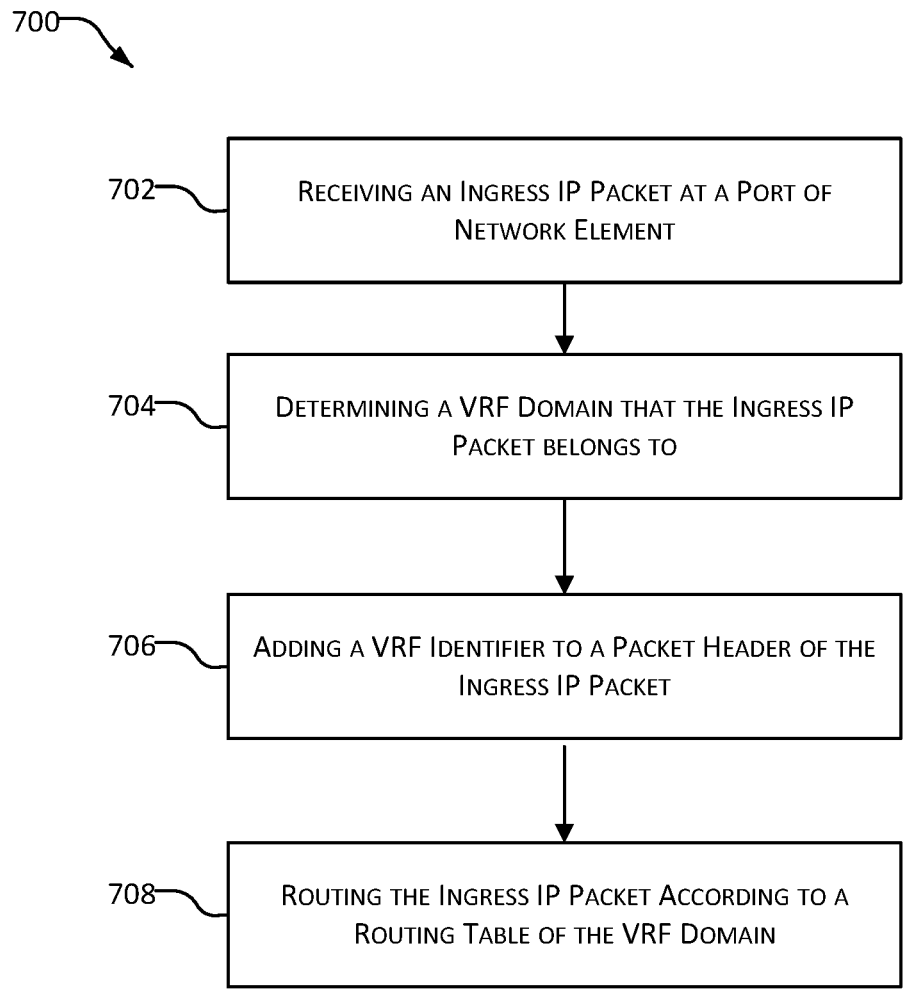
FIG. 7 depicts an illustrative flow chart demonstrating an example process for adding a VRF identifier to a packet header.

FIG. 7 depicts an illustrative flow chart demonstrating an example process 700 for adding a VRF identifier to a packet header. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by routers 105, 505, or 605. The code may be stored on a computer-readable storage medium, for example, in the form of a computer program including a plurality of instructions executable by one or more processors. The computer-readable storage medium may be non-transitory.

In process block 702, an ingress IP packet is received at a port (e.g. port 120) of a network element (e.g. 105, 505, or 605). In process block 704, a VRF domain that the ingress IP packet belongs to is determined. The VRF domain that the ingress IP packet belongs to may be determined based on the port the packet was received on, a VLAN identifier in the packet header, a source IP of the packet, a destination IP of the packet, an IP protocol, or otherwise. In process block 706, a VRF identifier is added to a packet header of the ingress IP packet. The VRF identifier may be added to VRF-ID field 220/320, for example. The VRF identifier represents a VRF domain that the ingress packet belongs to. In process block 708, the ingress IP Packet is routed according to a routing table of the VRF domain the ingress IP packet belongs to. The routing table may be stored in a memory of the network element.

Figure 8:
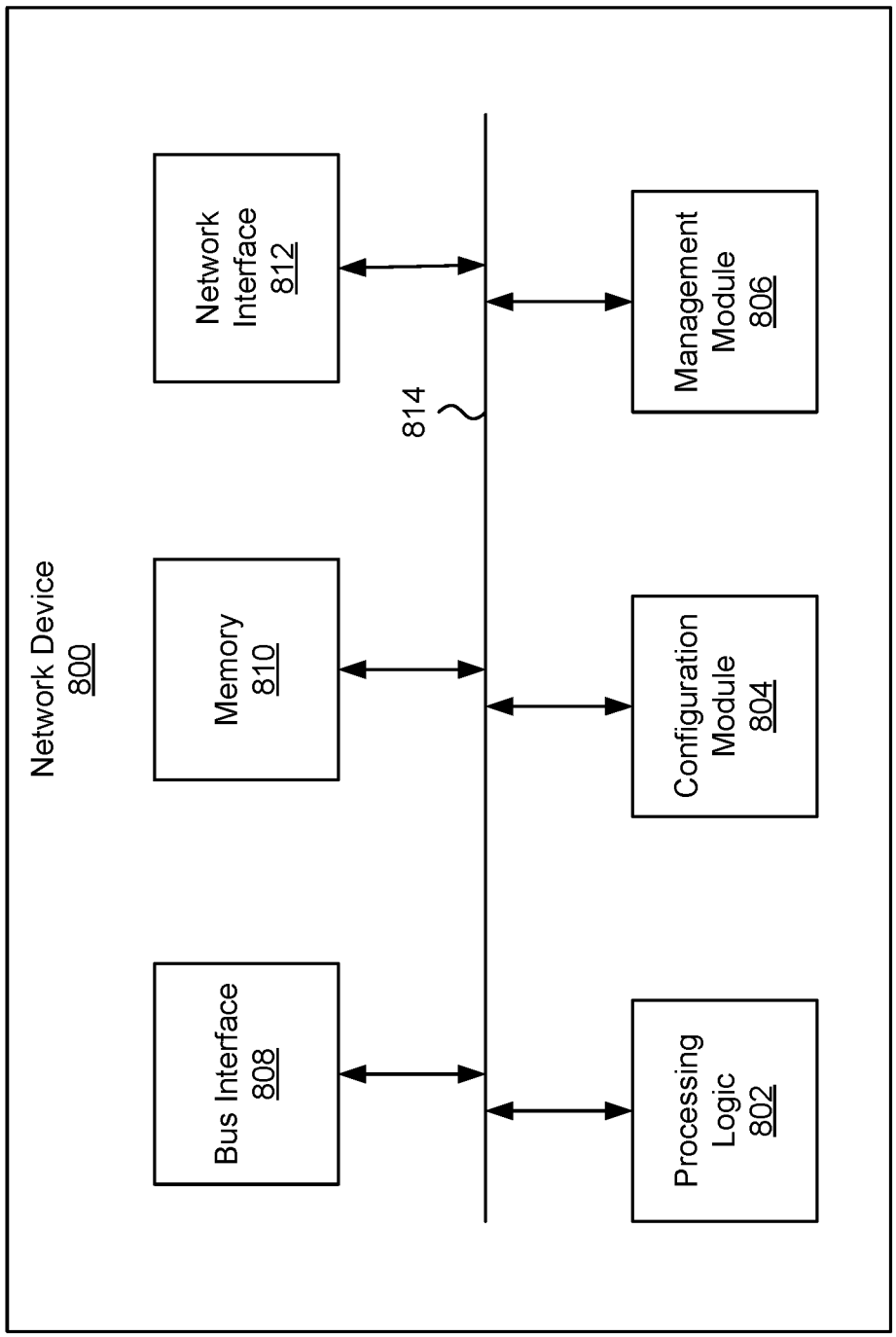
FIG. 8 illustrates an example architecture for features and systems described herein that includes one or more service provider computers and/or a user device connected via one or more networks, according to some embodiments.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel. Network element 485 and routers 105, 405, 505, 605 may include all or some of the modules of network device 800.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800. Memory 810 may include the routing tables for different VRFs.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports (e.g. ports 120) for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
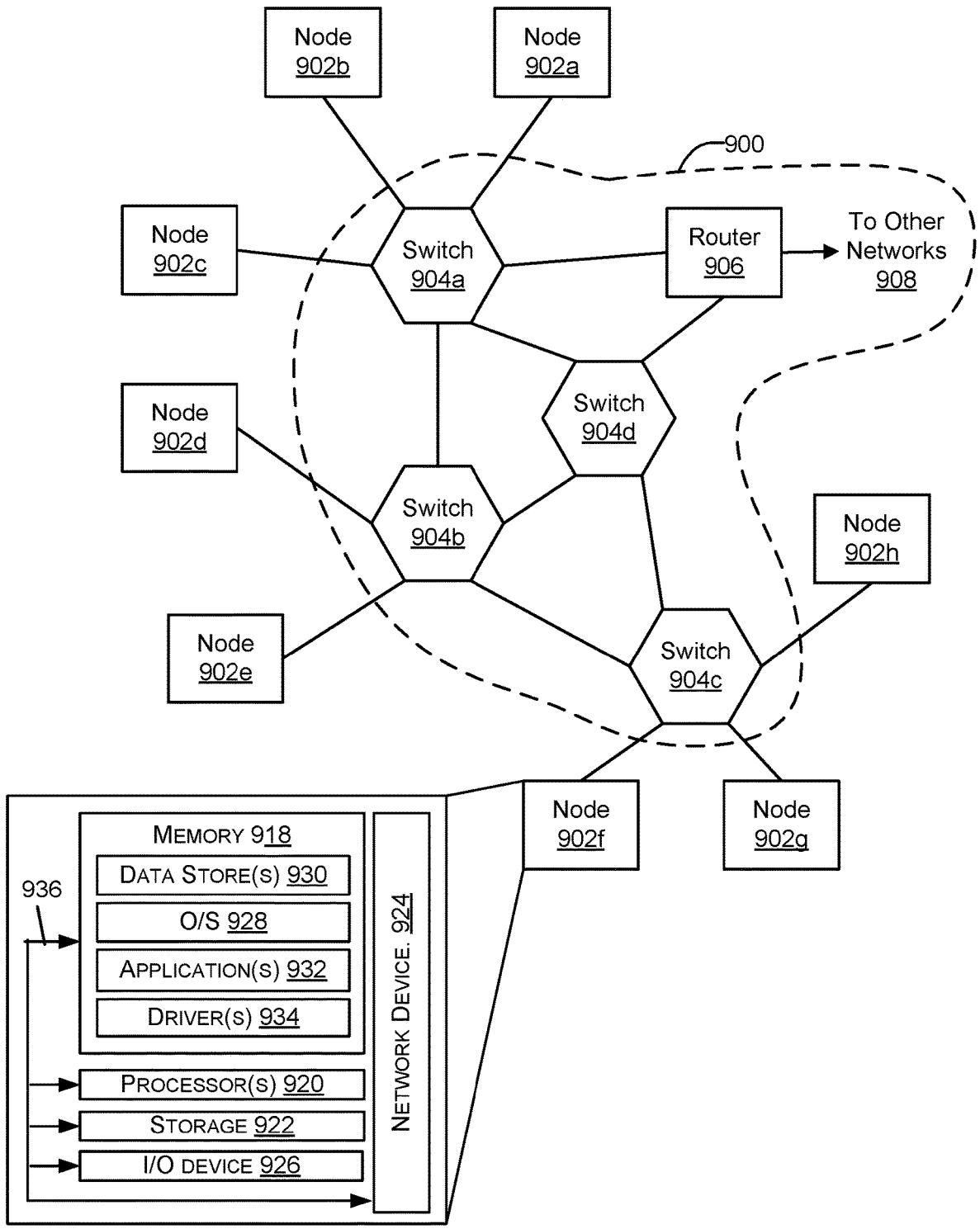
FIG. 9 illustrates aspects of an example environment of a computing system for implementing aspects in accordance with some embodiments.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding/routing tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8. In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
a first router operable to route packets for a first network and a second network, wherein the first router is configured with a first part of a Virtual Routing and Forwarding (VRF) domain, wherein the first router includes a memory for storing a first plurality of routing tables including a first routing table, wherein the first routing table is associated with the VRF domain, wherein the first routing table enables routing of packets within the VRF domain, and wherein the first part of the VRF domain does not include the second network; and a second router operable to route packets for the second network and a third network, wherein the second router is configured with a second part of the VRF domain, wherein the second router includes a memory for storing a second plurality of routing tables including a second routing table, wherein the second routing table is associated with the VRF domain, wherein the second routing table enables routing of packets within the VRF domain, and wherein the second part of the VRF domain does not include the second network;

wherein the first router is operable to, upon receiving a packet including an Internet Protocol (IP) header from the first network:

determine, using a VRF identifier included in an options field or an extension header field of the IP header of the packet, that the packet is to be routed within the VRF domain;

select, using the VRF identifier, the first routing table;

determine, using the first routing table, that a destination for the packet is in the third network;

transmit, using information from the first routing table, the packet over the second network;

and wherein the second router is operable to, upon receiving the packet from the second network:

determine, based on the VRF identifier included in the IP header of the packet, that the packet is to be routed within the VRF domain;

select, using the VRF identifier, the second routing table;

determine, using the second routing table, a destination in the third network for the packet; and transmit the packet over the third network.

2. The system of claim 1, wherein the first part of the of the VRF domain includes a plurality of network devices in the first network, and wherein the second part of the VRF domain includes a plurality of network devices in the third network.

3. The system of claim 1, wherein the first router is further operable to:

determine that the packet does not include the VRF identifier;

determine the VRF identifier using information provided by the IP header of the packet; and insert the VRF identifier into the IP header of the packet.

4. The system of claim 1, wherein the first router is further operable to:

determine, from a first field in the IP header of the packet, that the IP header of the packet includes the VRF identifier, wherein the VRF identifier is included in a second field in the IP header of the packet, and wherein the second field is different from the first field.

5. The system of claim 1, further comprising:

a third router operable to route packets for the second network and a fourth network, wherein, upon receiving a second packet from the first router, the second packet including the VRF identifier, the third router is operable to:

determine that the third router is unable to recognize the VRF ID; and route the second packet without using the VRF ID.

6. The system of claim 1, wherein:

the packet is formatted according to Internet Protocol version 4 (IPv4), and the VRF identifier is included in an options field of an IPV4 header.

7. The system of claim 1, wherein:

the packet is formatted according to Internet Protocol version 6 (IPv6), and the VRF identifier is included in an extension field of an IPV6 header.

8. The system of claim 1, wherein the first router is further operable to encapsulate the packet within a tunneling packet format, wherein the packet is transmitted over a tunnel over the second network.

9. A method comprising:

transmitting, by a first router, a packet including an Internet Protocol (IP) header received from a first network over a second network using a first routing table selected from a first plurality of routing tables based on a Virtual Routing and Forwarding (VRF) identifier included in an options field or an extension header field of the IP header of the packet;

receiving, by a second router, the transmitted packet from the second network;

determining, by the second router, using a second routing table selected from a second plurality of routing tables based on the VRF identifier included in the IP header of the packet, that the packet is to be routed to a destination in a third network; and transmitting the packet over the third network, wherein the first network and the third network are included in a VRF domain, and the VRF domain does not include the second network.

10. The method of claim 9, further comprising:

determining, by the first router, that the packet does not include the VRF identifier;

determining the VRF identifier using information provided by the IP header of the packet; and inserting the VRF identifier into the IP header of the packet.

11. The method of claim 9, wherein the first router is further operable to:

determining, by the first router, from a first field in the IP header of the packet, that the IP header of the packet includes the VRF identifier, wherein the VRF identifier is included in a second field in the IP header of the packet, and wherein the second field is different from the first field.

12. The method of claim 9, further comprising:

receiving, by a third router operable to route packets for the second network and a fourth network, a second packet over the second network from the first router, the second packet including the VRF identifier;

determining that the third router is unable to recognize the VRF ID; and routing the second packet without using the VRF ID.

13. The method of claim 9, wherein:

wherein the packet is formatted according to Internet Protocol version 4 (IPv4), and the VRF identifier is included in an options field of an IPV4 header.

14. The method of claim 9, wherein:

the packet is formatted according to Internet Protocol version 6 (IPv6), and the VRF identifier is included in an extension field of an IPV6 header.

15. The method of claim 9, further comprising:
encapsulating the packet within a tunneling packet format, wherein the packet is transmitted over a tunnel over the second network.

\* \* \* \* \*